(12) United States Patent
Zaccaria

(10) Patent No.: US 10,154,127 B1
(45) Date of Patent: Dec. 11, 2018

(54) ANTI-GLARE SHADE, PRIVACY HOOD AND PROTECTIVE COVER FOR MOBILE ELECTRONIC DEVICES

(71) Applicant: Nathan J. Zaccaria, Long Branch, NJ (US)

(72) Inventor: Nathan J. Zaccaria, Long Branch, NJ (US)

( * ) Notice: Subject to any disclaimer, the term of this patent is extended or adjusted under 35 U.S.C. 154(b) by 0 days.

(21) Appl. No.: 15/694,781

(22) Filed: Sep. 2, 2017

Related U.S. Application Data

(60) Provisional application No. 62/547,775, filed on Aug. 19, 2017.

(51) Int. Cl.
| | |
|---|---|
| H04B 1/034 | (2006.01) |
| H04M 1/04 | (2006.01) |
| H04M 1/02 | (2006.01) |
| A45C 11/00 | (2006.01) |

(52) U.S. Cl.
CPC ............... H04M 1/04 (2013.01); A45C 11/00 (2013.01); H04M 1/0266 (2013.01); *A45C 2011/002* (2013.01)

(58) Field of Classification Search
CPC .... H04B 1/3888; H04M 1/185; G06F 1/1639; G06F 1/1647
USPC .............................................. 455/575.8, 574.1
See application file for complete search history.

(56) References Cited

U.S. PATENT DOCUMENTS

| | | | |
|---|---|---|---|
| 2,654,173 A | 10/1953 | Christensen | |
| 5,218,474 A | 6/1993 | Kirschner | |
| 5,508,757 A | 4/1996 | Chen | |
| 5,877,896 A | 3/1999 | Gremban | |
| 6,144,419 A | 11/2000 | Schmidt | |
| 6,302,546 B1 | 10/2001 | Kordiak | |
| 6,536,655 B1 | 3/2003 | Humphrey | |
| 8,919,549 B1 | 12/2014 | Tashjian | |
| 9,022,341 B2 | 5/2015 | Radmard | |
| 9,351,415 B2 | 5/2016 | Zaccaria | |
| 2004/0206645 A1 | 10/2004 | Roubanis | |
| 2011/0203955 A1 | 8/2011 | Fasula | |

OTHER PUBLICATIONS http://www.banggood.com/Sun-Hood-Sun-Shade-for-DJI-Phantom-2-Vision-Vision-FC40-p-939698.html; Jun. 19, 2015 printout.
http://www.amazon.com/iclipse-the-sunshade-for-iPad/dp/B006OYBE8C/ref=pd_sxp_redirect.
http://www.amazon.com/LILLIPUT-Sunhood-Sunshade-Monitor-VIVITEQ/dp/B00HG1GHRG.
http://www.hoodivision.com/#!products/cuou.
http://www.amazon.com/Cellphone-Monitor-Sunshade-Transmitters-Suitable/dp/B00LXD33EI.

*Primary Examiner* — Tu X Nguyen
(74) *Attorney, Agent, or Firm* — Walter J. Tencza, Jr.

(57) ABSTRACT

An apparatus including a first central section, a second central section, a left side wall, and a right side wall. The first and second central sections, the left side wall, and the right side wall may be attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section.

22 Claims, 15 Drawing Sheets

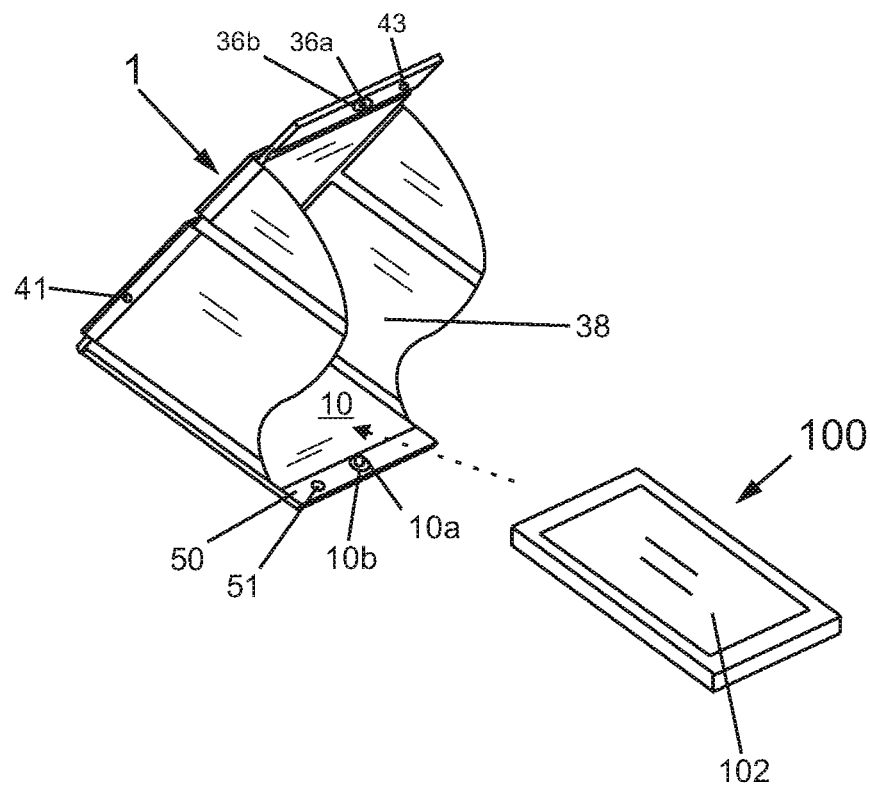
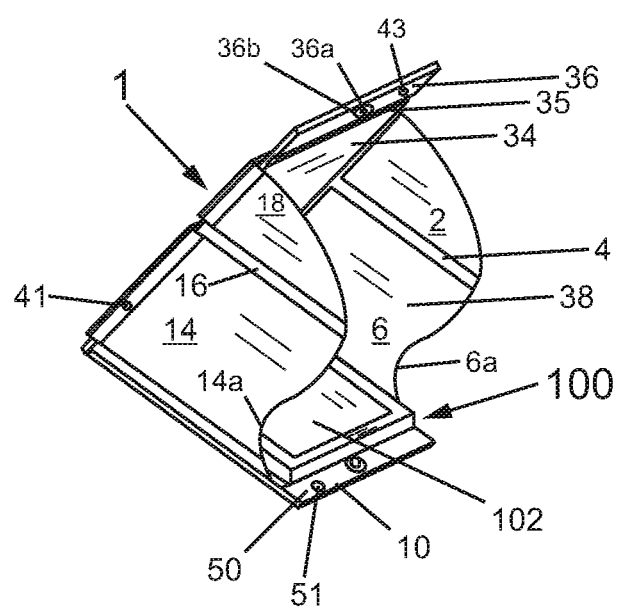

US 10,154,127 B1

ANTI-GLARE SHADE, PRIVACY HOOD AND PROTECTIVE COVER FOR MOBILE ELECTRONIC DEVICES

CROSS REFERENCE TO RELATED APPLICATION(S)

This application claims the priority of U.S. provisional patent application, Ser. No. 62/547,775, filed on Aug. 19, 2017, inventor and applicant Nathan J. Zaccaria, titled "ANTI-GLARE SHADE, PRIVACY HOOD AND PROTECTIVE COVER FOR MOBILE ELECTRONIC DEVICES".

FIELD OF THE INVENTION

This invention relates to accessories for use with mobile electronic devices

BACKGROUND OF THE INVENTION

There are various known accessories related to mobile electronic devices. A shading device for a handheld electronics device is shown in U.S. Pat. No. 9,351,415, to the present inventor, Nathan J. Zaccaria, issued on May 24, 2016, which is incorporated by reference herein.

SUMMARY OF THE INVENTION

In at least one embodiment, an apparatus is provided comprising: a first central section, a second central section, a left side wall, and a right side wall. The first central section, the second central section, the left side wall, and the right side wall may be attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section.

The first central section may be at an angle of about seventy degrees with respect to the second central section in the first assembled state. The apparatus may be configured so that the apparatus can alternately be placed in a flat state, in which the first central section, the second central section, the left side wall, and the right side wall are located in one plane or placed in the first assembled state. The left side wall may be attached along a first linear section to a first folding section, wherein the first linear section is at an angle of less than ninety with respect to the first central section, in the flat state. The right side wall may be attached along a second linear section to a second folding section, wherein the second linear section is at an angle of less than ninety degrees with respect to the first central section, in the flat state.

The first folding section may attach to the second central section, and the left side wall is at approximately a ninety degree angle with respect to the first folding section, when the apparatus is in the first assembled state; and the second folding section may attach to the second central section, and the right side wall is at approximately a ninety degree angle with respect to the second folding section, when the apparatus is in the first assembled state.

The first linear section may be made of a thinner material than a majority of the left side wall, and the second linear section may be made of a thinner material than a majority of the right side wall.

The left side wall may be attached along a first linear section to the first central section; wherein the first linear section has a length, a width, and a depth, wherein the length of the first linear section is substantially greater than the width of the first linear section, and the width of the first linear section is greater than the depth of the first linear section; and wherein the first linear section is parallel to the first central section, and wherein the first linear section has a first opening having a diameter less than the width of the first linear section.

The right side wall may be attached along a second linear section to the first central section; wherein the second linear section has a length, a width, and a depth, wherein the length of the second linear section is substantially greater than the width of the second linear section, and the width of the second linear section is greater than the depth of the second linear section; and wherein the second linear section is parallel to the first central section, and wherein the second linear section has a second opening having a diameter less than the width of the second linear section.

In at least one embodiment, at least part of the left side wall is attached along a third linear section to a third folding section, wherein the third linear section is at an angle of less than ninety degrees with respect to the first central section, in the flat state, which is different from the angle of the first linear section with respect to the first central section in the flat state; wherein at least part of the right side wall is attached along a fourth fold line to a fourth linear section, wherein the fourth linear section is at an angle of less than ninety degrees with respect to the first central section, in the flat state, which is different from the angle of the second linear section with respect to the central section in the flat state; wherein the third linear section attaches to the second central section, and the at least part of the left side wall is at approximately a ninety degree angle with respect to the third linear section, when the apparatus is in a second assembled state which is different from the first assembled state; and wherein the fourth linear section attaches to the second central section, and at least part of the right side wall is at approximately a ninety degree angle with respect to the fourth folding section, when the apparatus is in the second assembled state.

In at least one embodiment, the first central section includes a first attachment device; wherein the second central section includes a second attachment device; and wherein the first and second attachment devices are configured to temporarily attach to each other to thereby temporarily attach the first central section and the second central section together in a closed state in which the first central section is substantially aligned and substantially parallel with the second central section, and the left side wall and the right side wall are located in between the first central section and the second central section.

The apparatus may be configured so that the mobile electronics device can remain on the first central section, substantially aligned and substantially parallel to the first central section, covered by the left side wall, and the right side wall, and the second central section, when the apparatus is in the closed state.

The left side wall may be divided by a first linear section which is parallel to the first central section, and the first linear section allows the left side wall to be easily folded along the first linear section; and the right side wall may be divided by a second linear section, which is parallel to the first central section, and the second linear section allows the right side wall to be easily folded along the second linear section.

Each of the left side wall, the right side wall, the first central section, and the second central section may include a pocket for holding an item.

The second central section may be attached along a first linear section to the first central section; wherein the first linear section has a length, a width, and a depth, wherein the length of the first linear section is substantially greater than the width of the first linear section, and the width of the first linear section is greater than the depth of the first linear section; and wherein the first linear section is parallel to the first central section, and wherein the first linear section has a first opening having a diameter less than the width of the first linear section.

The first central section may include a retainer section which takes up less than a majority of the first central section, and which is thicker in depth than a remainder of the first central section, and is configured to inhibit the mobile electronics device from sliding off of the first central section.

The first folding section may encompass a first area; wherein the first folding section includes a first magnetic attraction device, wherein the first magnetic attraction device encompasses a first region which is less than half the first area; and the second folding section may encompass a second area; wherein the second folding section includes a second magnetic attraction device, wherein the second magnetic attraction device encompasses a second region which is less than half the second area; wherein the second central section encompasses a third area; wherein the second central section includes a third magnetic attraction device, wherein the third magnetic attraction device encompasses a third region which is less than half the third area; and wherein the apparatus is configured so that in the first assembled state, the first magnetic attraction device, the second magnetic attraction device, and the third magnetic attraction device substantially align with each other and are attracted to each other magnetically, and attach to each other magnetically, to attach the first folding section, the second folding section, and the second central section to each other, to keep the apparatus in the first assembled state.

The first central section may have a top surface which is comprised of an attachment device which is configured to attach to the mobile electronic device for temporarily holding the mobile electronics device to the first central section when the apparatus is in the first assembled state.

The first central section may have a top surface which is comprised of an attachment device which is configured to attach to the mobile electronic device for temporarily holding the mobile electronics device to the first central section when the apparatus is in the first assembled state; and wherein the first central section may have a bottom surface, opposite the top surface, wherein the bottom surface is comprised of an attachment device which is configured to attach to the mobile electronic device for temporarily holding the mobile electronics device to the first central section when the apparatus is in the closed state.

In at least one embodiment, an apparatus is provided comprising a first central section, a second central section, a left side wall, and a right side wall; and wherein the first central section, the second central section, the left side wall, and the right side wall are attached together in a first assembled state so that the first central section is adjacent to and at a first angle of about ninety degrees or less and more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section; and wherein the first central section includes a first attachment device; wherein the second central section includes a second attachment device; and wherein the first and second attachment devices are configured to temporarily attach to each other to thereby temporarily attach the first central section and the second central section together in a closed state in which the first central section is substantially aligned and substantially parallel with the second central section, and the left side wall and the right side wall are located in between the first central section and the second central section.

In at least one embodiment, a method is provided including the steps of placing an apparatus in a flat state, such that a left side wall, a first central section, a right side wall, and a second central section of the apparatus, are all substantially in the same plane; placing the apparatus in a first assembled state in which the first central section, the second central section, the left side wall, and the right side wall are attached together so that the first central section is adjacent to and at a first angle of substantially less than ninety degrees and substantially more than zero degrees with respect to the second central section, and at least a portion of the left side wall and at least a portion of the right side wall are adjacent to and approximately perpendicular to the second central section, and so that a mobile electronics device having a screen, can be placed on the first central section, and the screen viewed, with at least the portion of the left side wall, the portion of the right side wall, and the second central section providing shading to the mobile electronics device when it is on the first central section.

The method may also include placing the apparatus in a closed state wherein first and second attachment devices are configured to temporarily attach to each other to thereby temporarily attach the first central section and the second central section together and the first central section is substantially aligned and substantially parallel with the second central section, and the left side wall and the right side wall are located in between the first central section and the second central section.

An apparatus of an embodiment of the present invention may be placed in the closed state, in accordance with a method of an embodiment of the present invention by: (i) folding the left side wall along a first line which is at an angle with respect to the first central section to form a modified left side wall, then folding the modified left side wall along a second line substantially parallel to the first central section to form a second modified left side wall, and then folding the second modified left side wall along a third line substantially parallel to the first central section to cause the first central section to completely overlap the second modified left side wall; (ii) folding the right side wall along a fourth line which is at an angle with respect to the first central section to form a modified right side wall, then folding the modified right side wall along a fifth line substantially parallel to the first central section to form a second modified right side wall, and then folding the second modified right side wall along a sixth line substantially parallel to the first central section to cause the first central section to completely overlap the second modified right side wall; and (iii) folding the second central section over the first central section so that it is substantially aligned with and substantially parallel to the first central section.

An apparatus of an embodiment of the present invention may be further placed in the closed state, in accordance with a method, by attaching a first attachment device of the first central section to a second attachment device of the second central section to thereby attach the first central section to the second central section.

BRIEF DESCRIPTION OF THE DRAWINGS

FIG. 7A shows the apparatus of FIG. 1A in the fifth state, and a mobile electronics device, such as a smart phone;

FIG. 7B shows the mobile electronics device of FIG. 7A inserted into an inner chamber of the apparatus of FIG. 1A in the fifth state;

DETAILED DESCRIPTION OF THE DRAWINGS

Figure 1A:
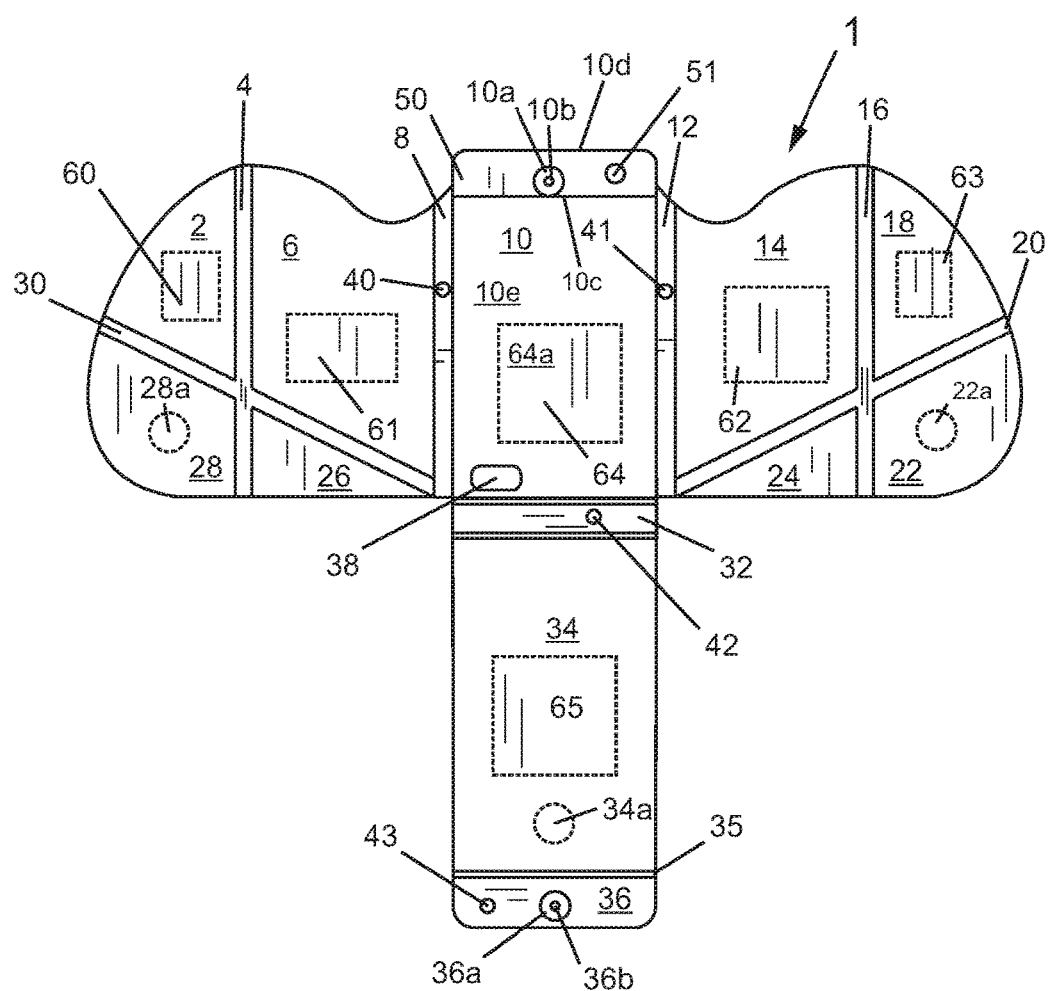
FIG. 1A shows a top view of an apparatus in accordance with an embodiment of the present invention, with the apparatus shown in a first state in which the apparatus is flattened.
Figure 1B:
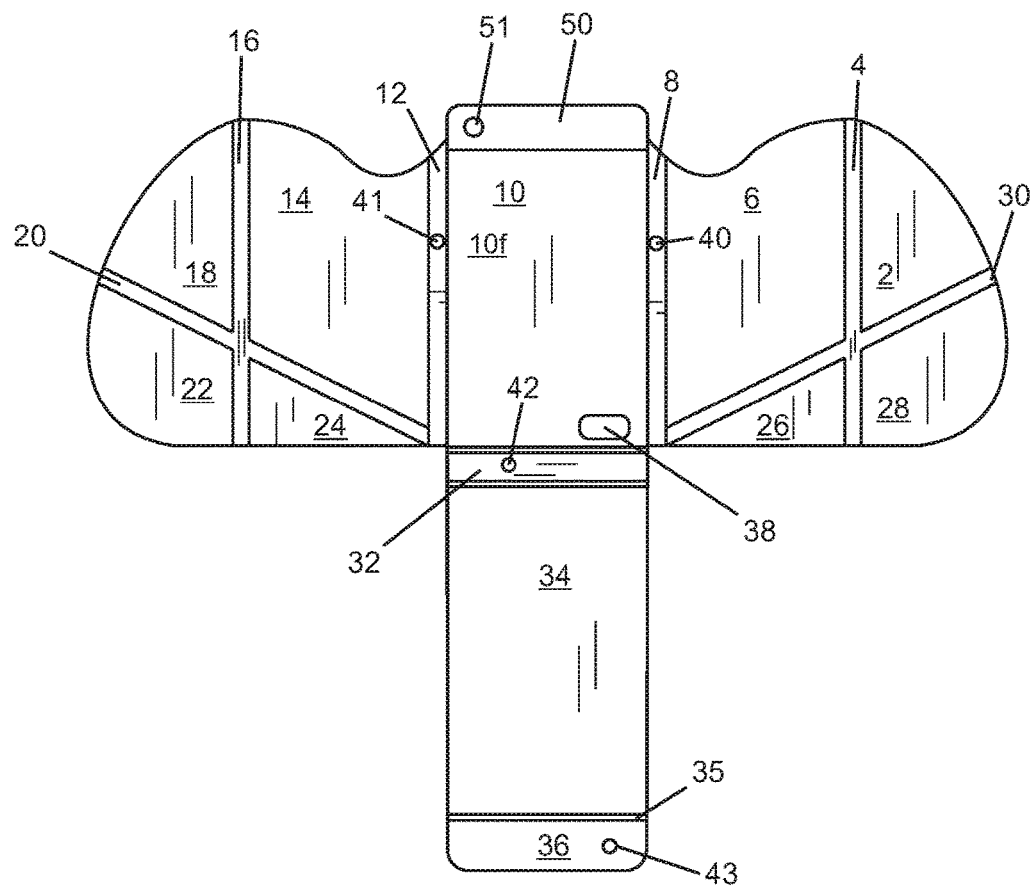
FIG. 1B shows a bottom view of the apparatus of FIG. 1A, in the first state.

FIG. 1A shows a top view of an apparatus 1 in accordance with an embodiment of the present invention, with the apparatus 1 shown in a first state in which the apparatus 1 is flattened. FIG. 1B shows a bottom view of the apparatus 1 of FIG. 1A, in the first state.

The apparatus 1 may include sections 2, 4, 6, 8, 10, 12, 14, 16, 18, 20, 22, 24, 26, 28, 30, 32, 34, 35, and 36. Each of sections 2, 6, 10, 14, 18, 22, 24, 26, 28, 34, and 36 may have three layers, which may include a covering top layer viewed form the top in FIG. 1A, a covering bottom layer, viewed from the bottom in FIG. 1B, and a stiff inner layer sandwiched between the top layer and the bottom layer. The stiff inner layer may be a flat sheet material, such as a stiff, rigid cardboard, a stiff rigid plastic material, or other stiff rigid materials. Each of sections 4, 8, 12, 16, 20, 30, 32, and 35 may have only two layers, such as a top layer and a bottom layer, similar to sections 2, 6, 10, 14, 18, 22, 24, 26, 28, 34, and 36, but may not include a rigid inner layer. The use of three layers, with an inner rigid layer, and two layers, without an inner rigid layer, is done to allow the apparatus 1 to fold easily in an appropriate manner. The top and bottom layers of sections 2, 4, 6, 8, 10, 12, 14, 16, 18, 20, 22, 24, 26, 28, 30, 32, 34, 35, and 36 may be made of a flexible material which is more flexible, and preferably substantially more flexible and bendable, than the inner rigid material for sections 2, 6, 10, 14, 18, 22, 24, 26, 28, 34, and 36. Generally, it is preferred that sections 2, 6, 10, 14, 18, 22, 24, 26, 28, 34, and 36 be more rigid than the sections 4, 8, 12, 16, 20, 30, 32, and 35, in terms of overall function (i.e. if there are three layers for section 2, the combination of three layers is more rigid than the combination of two layers for section 4, however, section 2 in at least one embodiment, could be only one rigid section, while section 4 could be only one less rigid section).

In other embodiments, sections 2, 4, 6, 8, 10, 12, 14, 16, 18, 20, 22, 24, 26, 28, 30, 32, 34, 35, and 36 may all have the same rigidity and/or be made of the same material, such as a single material, however, by creasing and/or bending sections 4, 8, 12, 16, 20, 30, 32, and 35 very sharply these sections may become flexible, or at least more flexible than prior to creasing and may then be used to provide the function for forming apparatus 1 into the state shown in FIGS. 6A-B and FIGS. 7A-7B.

In addition the inner rigid layer of section 10 is preferably, in at least one embodiment, made of more rigid material than the inner rigid layers of sections 2, 6, 14, 18, 22, 24, 26, 28, 34, and 36. Providing a more rigid material for section 10 provides support for a smart phone 100 as shown in FIG. 7B. The other sections 2, 6, 14, 18, 22, 24, 26, 28, 34, and 36 do not need to be as rigid as section 10, in at least one embodiment, and providing a less rigid material for those other sections, saves on costs for the apparatus 1.

When section 10 is very rigid, it helps with support for the device or smartphone 100 being placed on it, but this also can add more stress to sections 8 and 12, and possibly 32, because when sections 8, 12, and 32 are less rigid and are then folded onto section 10 which is more rigid, it can create some resistance since it is butting up against something stiffer and this could cause the material to wear out faster over time. Therefore, in some embodiments, section 10 may have the same rigidity and/or be may of the same material as sections 2, 6, 28, 26, 14, 18, 24, 22, 34, and 36.

The section 10, in at least one embodiment, includes an opening or openings 38 located anywhere on section 10, which may be aligned with a camera lens for the device of smartphone 100.

The sections 10 and 34 may be part of or may be called first and second central sections due to their central location in FIG. 1A. The combination of sections 2 and 6, and the part of section 4 connecting sections 2 and 6 may be part of or may be called a left side wall, because in a first assembled state of FIG. 6A, it forms a left side wall. The combination of sections 14 and 18, and the part of section 16 connecting sections 14 and 18 may be part of or may be called a right side wall, because in a first assembled state of FIG. 6A, it forms a right side wall.

Figure 2A:
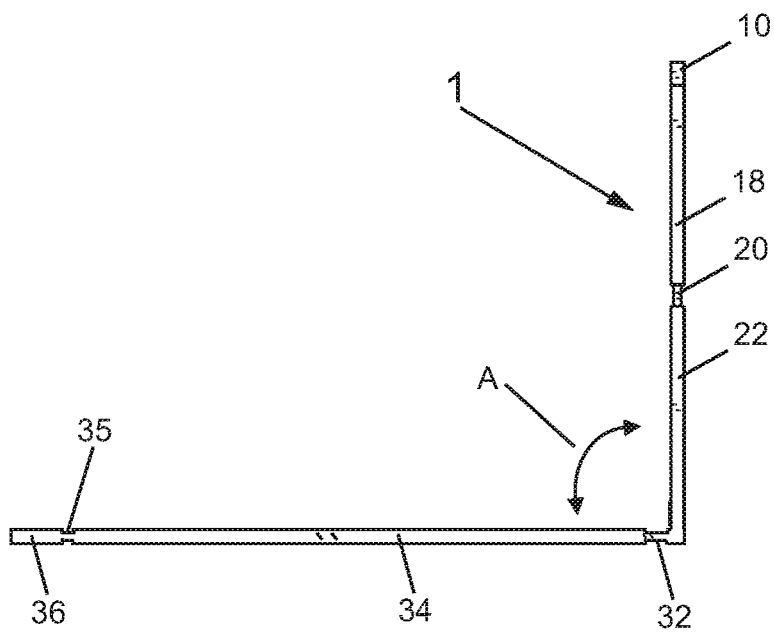
FIG. 2A shows a right side view of the apparatus of FIG. 1A in a second state, in which a first part of the apparatus is bent to a ninety degree angle with respect to a second part of the apparatus.
Figure 2B:
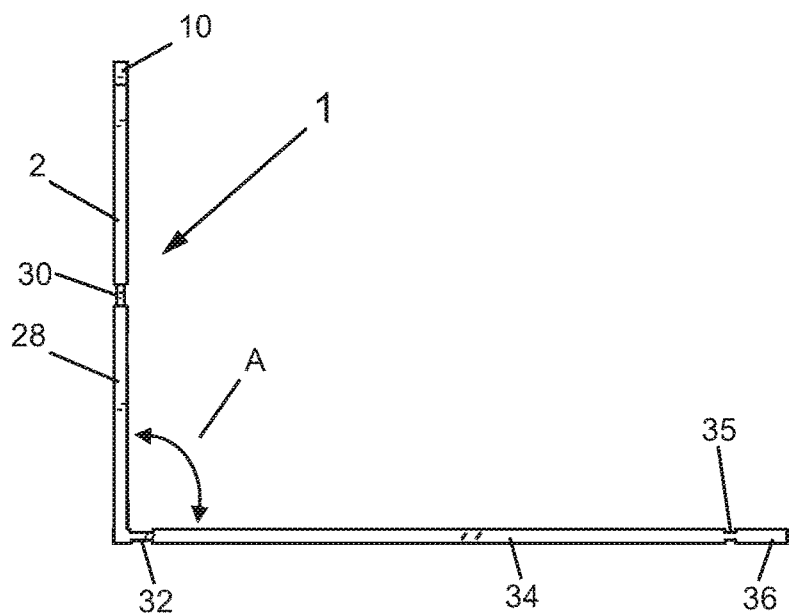
FIG. 2B shows a left side view of the apparatus of FIG. 1A in the second state.
Figure 3A:
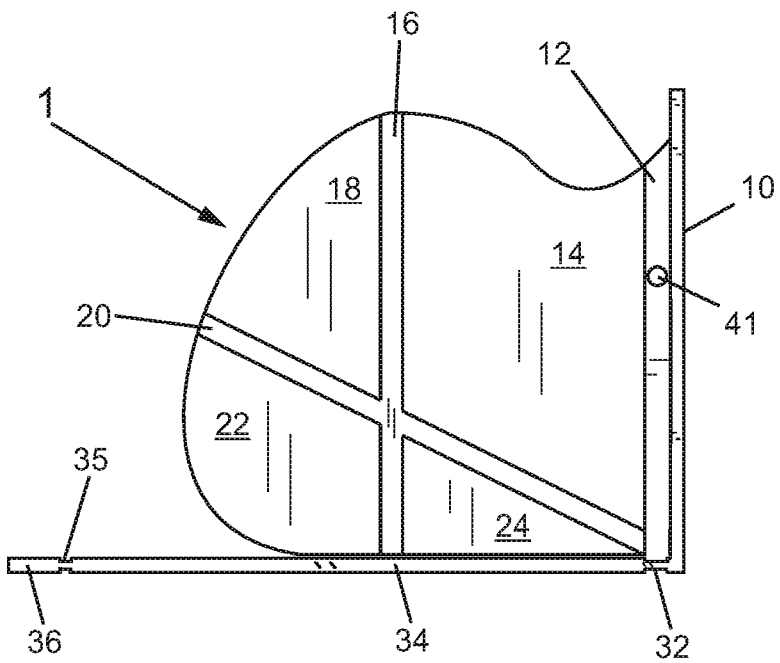
FIG. 3A shows a right side view of the apparatus of FIG. 1A in a third state, in which a third part and a fourth part of the apparatus are bent to a ninety degree angle with respect to the rest of the apparatus.
Figure 3B:
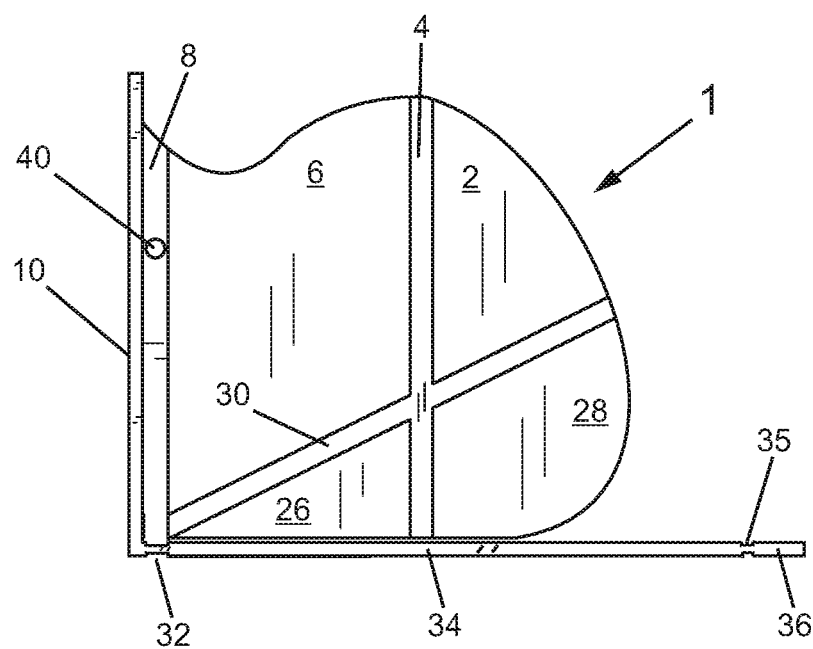
FIG. 3B shows a left side view of the apparatus of FIG. 1A in the third state.

FIG. 2A shows a right side view of the apparatus 1 of FIG. 1A in a second state, in which a first part (including sections 2, 10, 18, 20, 22, 28, and 30) of the apparatus 1 is bent to a ninety degree angle A with respect to a second part (including sections 32, 34, 35, and 36) of the apparatus 1. FIG. 2B shows a left side view of the apparatus 1 of FIG. 1A in the second state;

FIG. 3A shows a right side view of the apparatus 1 of FIG. 1A in a third state, in which a third part (including sections 12, 14, 16, 18, 20, 22, 24) and a fourth part (including sections 2, 4, 6, 8, 26, 28, and 30) of the apparatus 1 are bent so that the third part and the fourth part are both perpendicular to sections 10 and 34. FIG. 3B shows a left side view of the apparatus 1 of FIG. 1A in the third state.

Figure 4A:
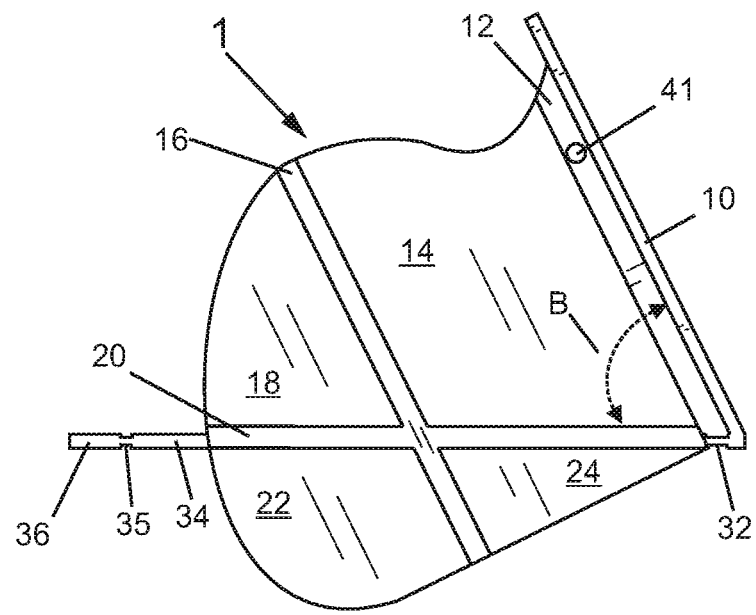
FIG. 4A shows a right side view of the apparatus of FIG. 1A in a fourth state, in which a fifth part of the apparatus is bent to a sixty degree angle with respect to a sixth part of the apparatus.
Figure 4B:
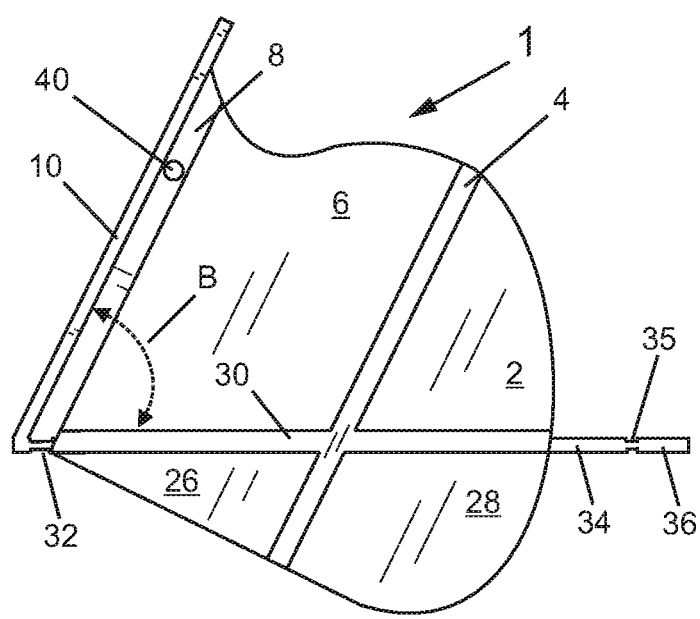
FIG. 4B shows a left side view of the apparatus of FIG. 1A in the fourth state.

FIG. 4A shows a right side view of the apparatus 1 of FIG. 1A in a fourth state, in which a fifth part (including section 10) of the apparatus 1 is bent to a seventy degree angle B with respect to a sixth part (including section 34, 35, and 36) of the apparatus 1. FIG. 4B shows a left side view of the apparatus 1 of FIG. 1A in the fourth state. The sections 20 and 30 are configured so that the in the fourth state they are both parallel or substantially parallel to the sections 34, 35, and 36.

Figure 5A:
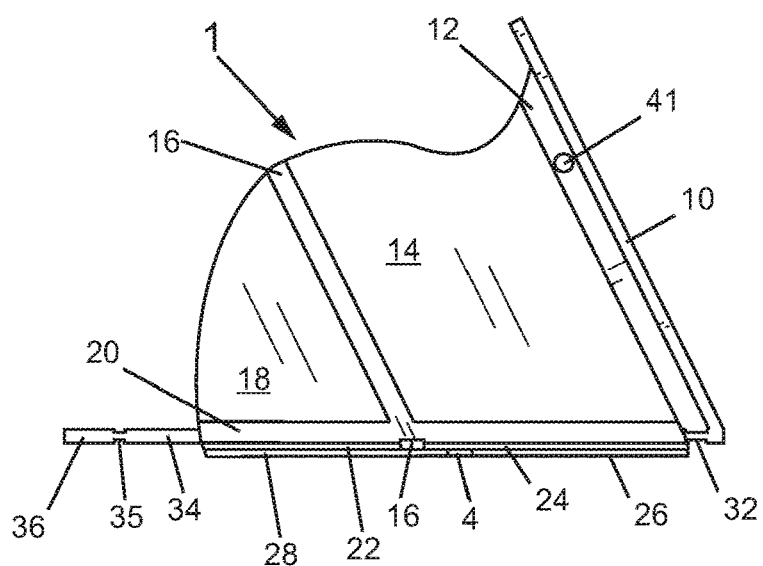
FIG. 5A shows a right side view of the apparatus of FIG. 1A in a fifth state, in which a seventh part and an eighth part of the apparatus are bent so that they overlap the sixth part of the apparatus.
Figure 5B:
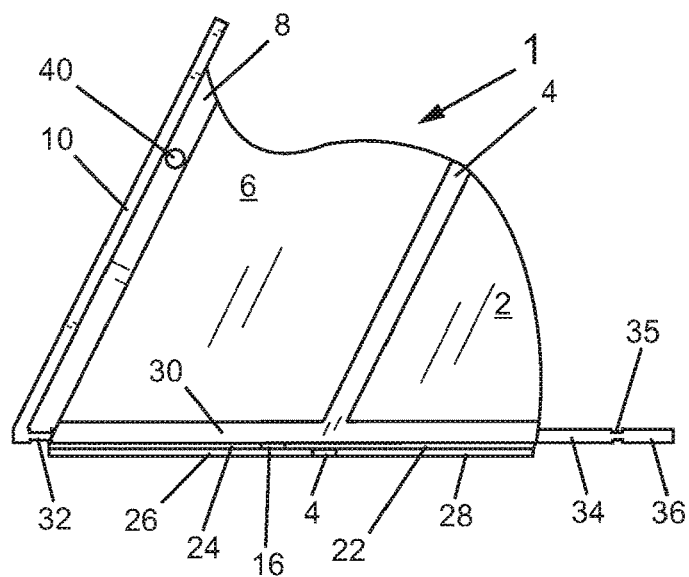
FIG. 5B shows a left side view of the apparatus of FIG. 1A in the fifth state.

FIG. 5A shows a right side view of the apparatus 1 of FIG. 1A in a fifth state, in which a seventh part (including sections 22 and 24) and an eighth part (including sections 26 and 28) of the apparatus 1 are bent so that they overlap or underlap the sixth part (including sections 34, 35, and 36) of the apparatus 1. FIG. 5B shows a left side view of the apparatus 1 of FIG. 1A in the fifth state.

Figure 6A:
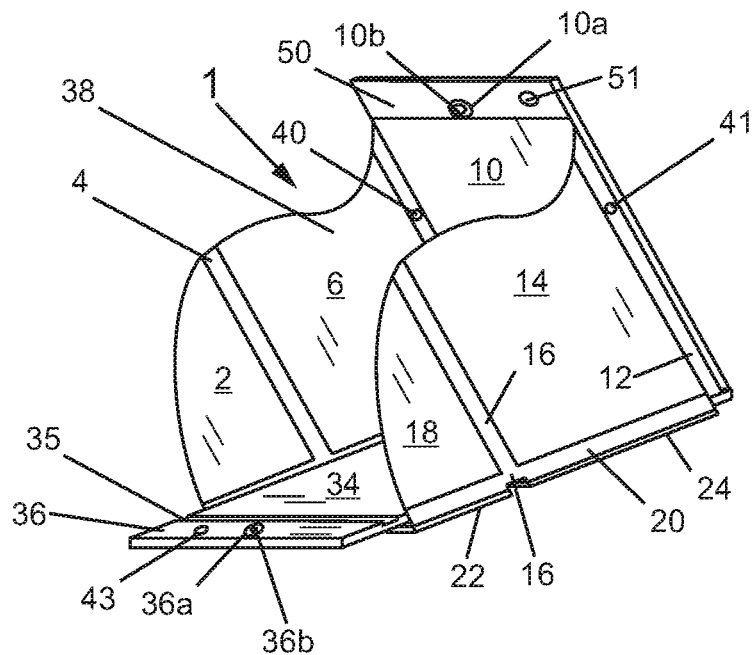
FIG. 6A shows a right, top, and front perspective view of the apparatus of FIG. 1A in the fifth state.
Figure 6B:
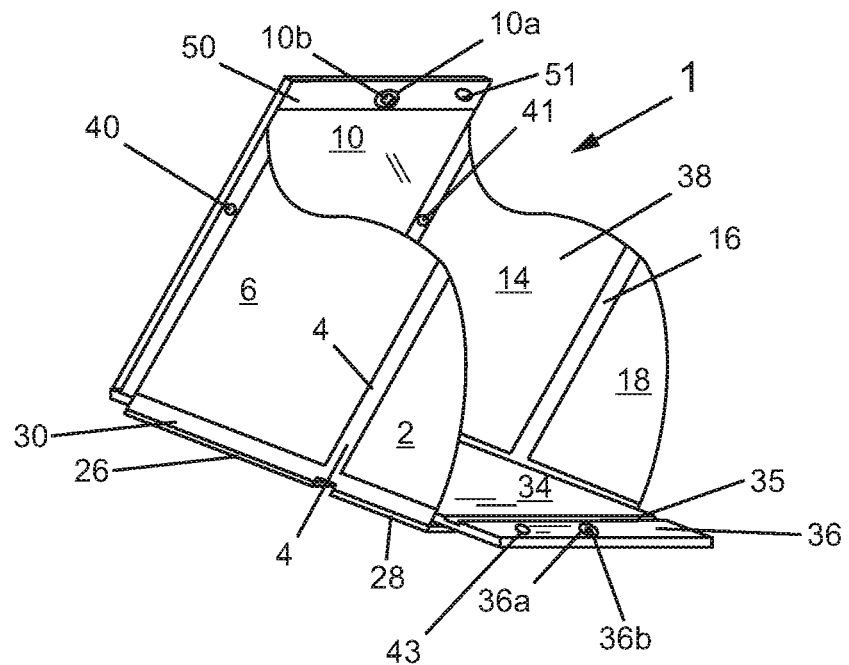
FIG. 6B shows a left, top, and front perspective view of the apparatus of FIG. 1A, in the fifth state.

FIG. 6A shows a right, top, and front perspective view of the apparatus 1 of FIG. 1A in the fifth state. FIG. 6B shows a left, top, and front perspective view of the apparatus 1 of FIG. 1A, in the fifth state.

FIG. 7A shows the apparatus 1 of FIG. 1A in the fifth state, and a mobile electronics device 100, such as a smartphone. FIG. 7B shows the mobile electronics device 100 of FIG. 7A inserted into an inner chamber 38 of the apparatus 1 of FIG. 1A in the fifth state. The mobile electronics device 100 is inserted so that the screen 102 is facing outwards as shown in FIG. 7B, and can be seen by an individual. Effectively a first wall, which may include sections 34, 35, and 36, a second wall which may include sections 14, 16, and 18, and a third wall, which may include sections 6, 4, and 2, are provided which shield the screen 102 of the mobile electronics device 100 from glare of the sun. The first wall (34, 35, and 36), in at least one embodiment, is at an angle with respect to the section 10, which may be an angle B shown in FIGS. 4A and 4B which may be about seventy degrees. The angle B may be in a range from 50 to 90 degrees, and the angle B may be adjustable. For example, less of sections 22, 24, 26, and 28 may be folded under or on top of section 34 and attached to section 34 to provide a higher angle, approaching ninety degrees. Alternatively, part of sections 2, 6, and 18, and 14 can be folded under or on top of section 34 to provide a lower angle, less than seventy degrees. While for the about seventy degree example the sections 20 and 30 are parallel or substantially parallel to section 34, for examples greater than about seventy degrees, or less than about seventy degrees, the sections 20 and 30 would be at an angle with respect to section 34. For examples greater than about seventy degrees, the sections 22, 24, and 26, and 28 would have to be bent or creased, and for examples less than about seventy degrees the sections 18, 14, 6, and 2 would have to be bent or creased. Alternately, additional flexible sections, similar to, or identical to sections 20 and 30, may be provided at different angles in different embodiments. For example, sections 20 and 30 are at an angle of seventy degrees or about seventy degrees (angle B) with respect to section 10. Flexible straight sections may be provided at an angle of sixty degrees and eighty degrees with respect to section 10, to easily configure the apparatus 1, into sixty, seventy, or eighty degree angles. In at least one embodiment, the sections 20 and 30 may be at an angle of between fifty and ninety degrees, inclusive, with respect to the section 10. The apparatus 1 can have multiple straight flexible sections, instead of one section 20, and multiple straight flexible sections, instead of one section 30, to allow the user to manually adjust to the angle of their choice.

The angle of about seventy degrees, for some purposes has been determined to be sufficient for someone to see the screen 102 comfortably, and to also block glare from the sun or other lights or other distractions or impediments to viewing screen 102. In at least one embodiment, the angle of about seventy degrees, for angle B in FIGS. 4A-4B has been determined to be critical for someone to see the screen 102 comfortably and to also block glare. However, generally, in accordance with embodiments of the present invention, the angle B may be substantially less than 90 degrees, and substantially more than zero degrees, such as for example between eighty and sixty degrees. The angle B needs to be substantially more than zero degrees or the entirety of the screen 102 cannot be seen, cannot be seen comfortably, or cannot be seen at all by a user. The angle B needs to be substantially less than ninety degrees, in one or more embodiments, or shading is not provided for overhead sun.

The second wall (14, 16, and 18) and the third wall (6, 4, and 2) are preferably parallel to each other, and perpendicular or substantially perpendicular to the section 10.

The sections 14 and 6 have curved in areas 14a and 6a, respectively, near device 100, to allow someone to insert thumbs, or fingers generally, for texting or otherwise using the device 100 or screen 102.

The sections 26, 28, 22, and 24 may also include Velcro (trademarked) or hooks or loops sections, magnetics or another attachment device on the top surface or bottom surface shown in FIG. 1A. If magnets are used they may be on the top surface of sections 26, 28, 22, and 24, they may be on the bottom surface, or they may be embedded within the material for those sections. The section 34 may have Velcro (trademarked) or hooks or loops sections, or another attachment device on the top surface or bottom surface, or if magnets are used they may be embedded within the material for section 34, shown in FIG. 1B, which mates, connects and/or attaches to the attachment devices of sections 26, 28, 22, and 24 in the state of FIGS. 5A and 5B to at least temporarily keep the apparatus 1 in the state of FIGS. 5A, 5B, 6A, 6B, 7A, and 7B.

The section 10 may also include Velcro (trademarked) or hooks or loops sections or another attachment device on the top surface 10e or on the pocket top surface 64a of optional pocket 64 shown in FIG. 1A for attaching to the device 100, and the sections 10 may include Velcro (trademark) or hooks or loops section on its bottom surface 10f shown in FIG. 1B, or on an optional pocket top surface if the pocket is on attached to or makes up a part of the bottom surface 10f, so that when the apparatus 1 is in a "closed" state, the mobile electronics device or smartphone 100 and/or cover of the device 100 can be temporarily attached to the bottom surface 10f of section 10. The device 100 may also include Velcro (trademarked) or hooks or loops sections or another attachment device on its bottom surface (opposite its screen 102) or device 100 may include a covering which includes such an attachment device. The bottom surface of device 100 may thus be at least temporarily attached to the top surface 10e of section 10, and a camera lens of device 100 aligned with opening 38 to allow pictures to be taken by device 100 through opening 38 of section 10 of the apparatus 1. In at least one embodiment section 10 may have one or more of openings similar to or identical to opening 38.

In at least one embodiment, the interior of the apparatus 1, in the state shown in FIGS. 6A-6B and 7A-B, such as including surfaces of sections 10, 6, 4, 2, 18, 16, 14, 34, 35, and 36, which face towards inner chamber 38, has a dark color, such as black in order to reduce glare or reflection from the sun or other light sources. In other embodiments, if the apparatus 1 is used for privacy but not necessarily to reduce glare, then lighter colors may be used for the interior which faces inner chamber 38.

Figure 8:
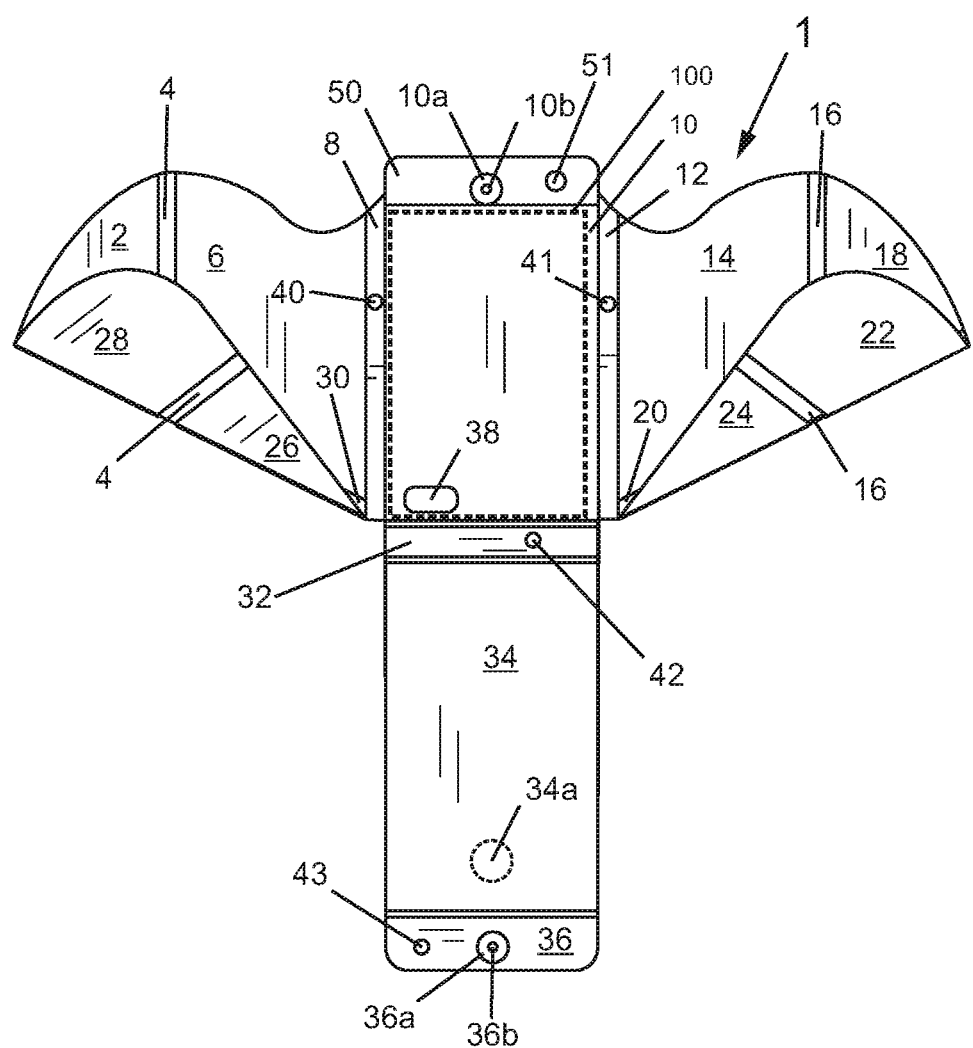
FIG. 8 shows a top view of the apparatus of FIG. 1 in a sixth state.

In at least one embodiment, the apparatus 1, can be placed in a "closed" state, in the following step by step manner. When the apparatus 1 is in the first state as shown in FIG. 1A, the sections 22 and 24 can be folded along the straight line formed by section 20 and onto sections 14 and 18; and in a similar manner, sections 26 and 28 can be folded along the straight line formed by section 30 and onto sections 2 and 6 to put the apparatus 1 in a sixth state, in which the apparatus 1 is folded and flattened as shown in FIG. 8.

Figure 9:
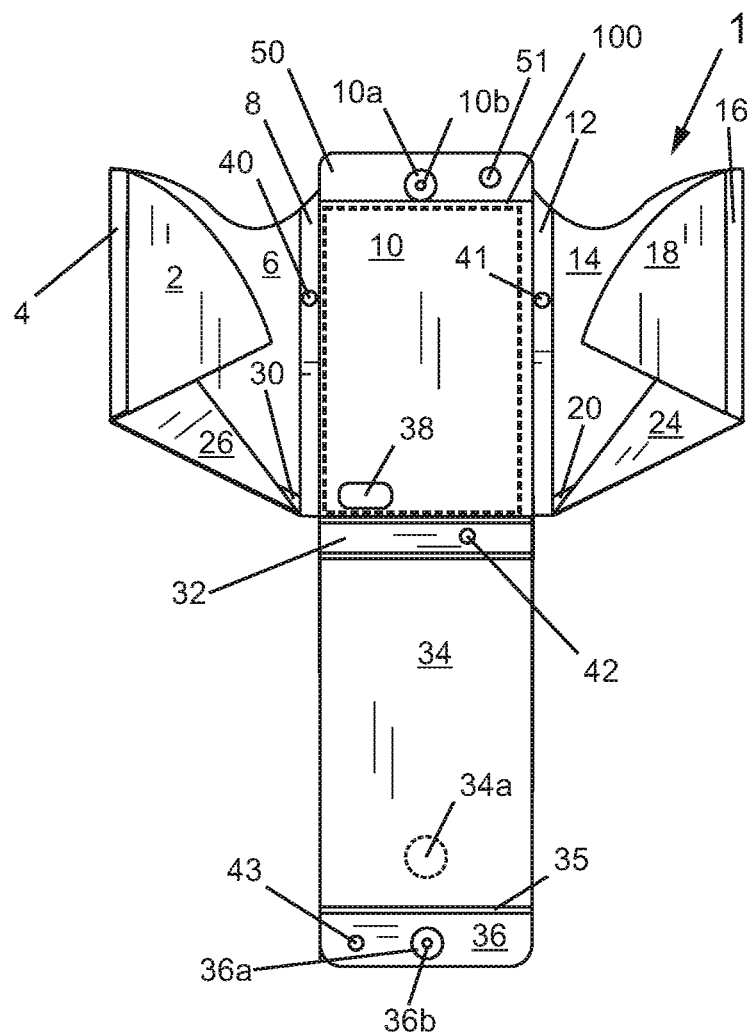
FIG. 9 shows a top view of the apparatus of FIG. 1 in a seventh state.

Next, the section 18 can be folded along the straight vertical line formed by part of section 16, and onto section 14; and the section 2 can be folded along the straight vertical line formed by part of section 4 and onto section 6 to put the apparatus 1 in a seventh state, in which the apparatus 1 is folded and flattened as shown in FIG. 9.

Figure 10:
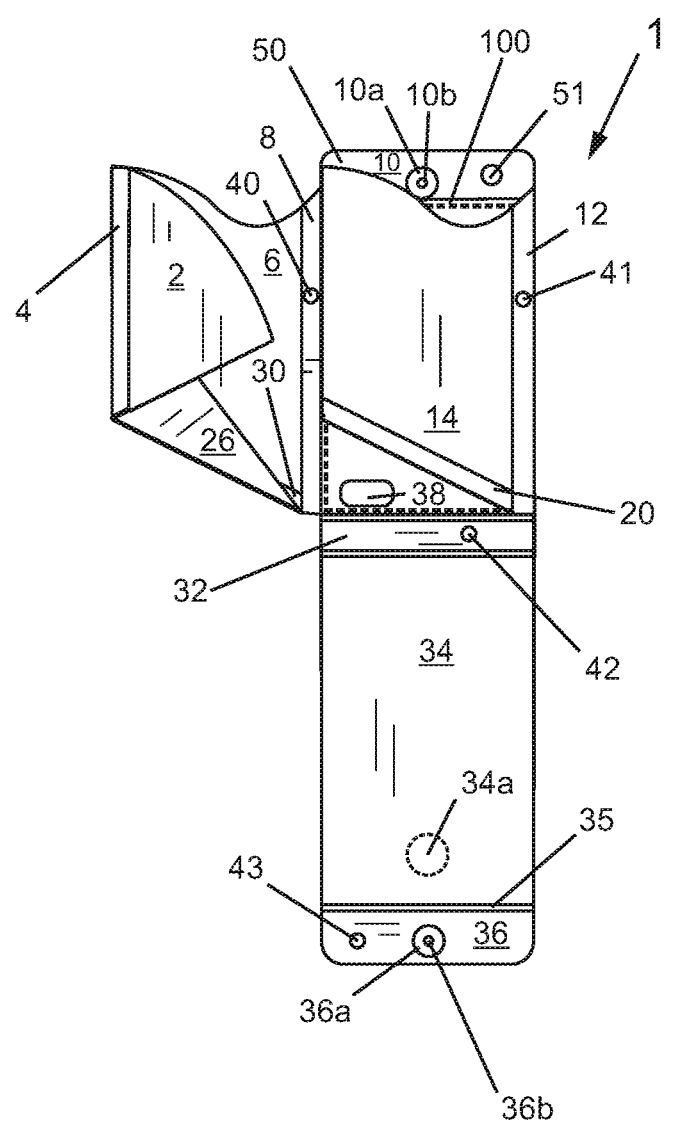
FIG. 10 shows a top view of the apparatus of FIG. 1 in an eighth state.
Figure 11:
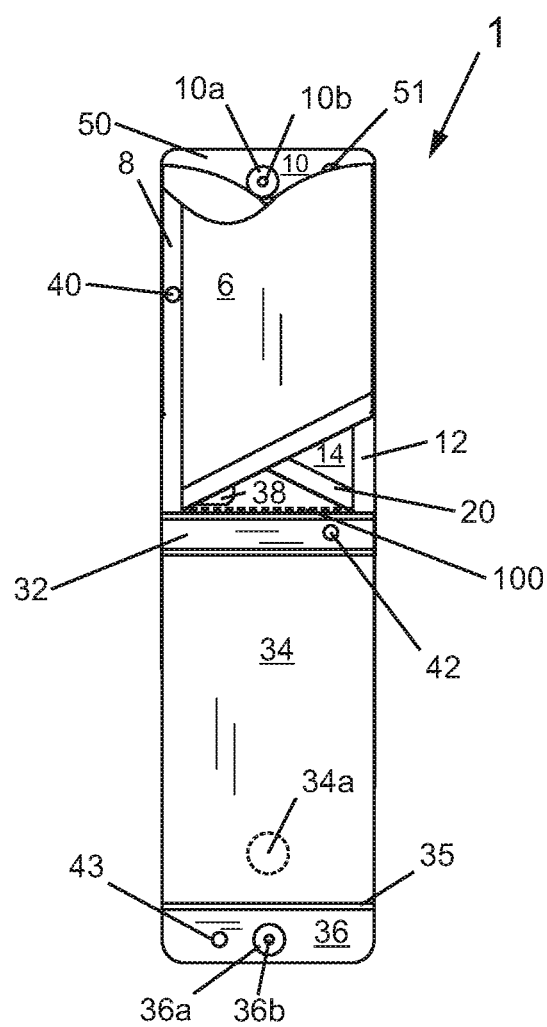
FIG. 11 shows a top view of the apparatus of FIG. 1 in a ninth state.

Next, the combination of sections 14, 16, 18, 22, 24, and 20 can be folded along the straight line formed by section 12 and onto section 10 to put the apparatus 1 in an eighth state as as shown in FIG. 10. Then the combination of sections 6, 4, 2, 30, 26, and 28 can be folded along the straight line formed by section 8 and onto section 10 and on top of the combination of sections 14, 16, 18, 22, 24, and 20 to put the apparatus 1 in a ninth state, in which the apparatus 1 is folded and flattened as shown in FIG. 11.

Figure 12:
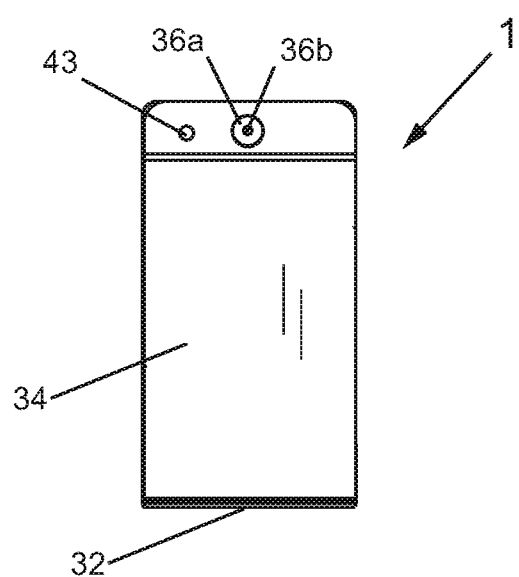
FIG. 12 shows a top view of the apparatus of FIG. 1 in a tenth or closed state.

Thereafter the section 34 can be folded along the straight line formed by section 32 and onto section 10 and onto all of the combination of sections 6, 4, 2, 30, 26, and 28 and sections 14, 16, 18, 22, 24, and 20. In at least one embodiment a protrusion or other attachment device 10b of device 10a of section 10 can be snapped into or otherwise attached to indentation or other attachment device 36b of device 36a of section 36, to temporarily hold the apparatus 1 in a tenth state or closed state as shown in FIG. 12. The attachments devices 10a, 10b, and 36a and 36b may be Velcro (trademarked) mating hooks and loops or some other attachment devices for temporarily attaching section 36 to section 10. There may be multiple attachment devices located on section 10 and multiple attachment devices located on section 36.

In at least one embodiment, a band, strap or some other means may be used on sections 10 and 34 to keep the apparatus remaining in a "closed" state, whether or not, a protrusion or other attachment device 10b of device 10a of section 10 is used or otherwise attached to indentation or other attachment device 36b of device 36a of section 36. A band or strap 200 is shown by dashed lines in FIG. 13A separate from the apparatus 1, and in FIG. 13B circling or surrounding a portion of section 10, and a portion of section 36 to help hold the sections 34 and 10 together in the closed state of FIGS. 13A-B. This keeps the apparatus 1 remaining in the "closed" state, whether or not sections 10 and 36 have components 10b, 10a, 36b and 36a. The band or strap 200 may be a rubber band, for example. In at least one embodiment the band or strap 200 may be attached to apparatus 1, such as attached to a portion of section 10 or a portion of section 36.

In at least one embodiment the apparatus 1 can be folded into an alternate "closed" state, from the apparatus 1 being in the state of FIG. 5A, 5B, 6A, 6B, 7A or 7B, to the first central section or section 10 being substantially aligned and substantially parallel to the second central section of section 34, without detaching the sections 22, 24, 26, and 28 from the section 34, by various folding methods.

In at least one embodiment of the present application, the apparatus 1 of the present application remains in the first assembled or upright state shown in FIGS. 5A-5B, 6A-6B, and 7A-7B, without any external pressure, at least in part, because of the orientation of the sections 4, 8, 12, and 16, and the relative rigidity of sections 6 and 14. Simply put, the apparatus 1 of the present application, cannot collapse from the state shown in FIGS. 6A-6B, without bending sections 6 and 14, and those sections are typically rigid. If one attempts to fold the apparatus 1 from the first assembled state in FIGS. 6A-6B, along lines 4 and 16, one cannot do so, at least not substantially, because of the manner of attachment of sections 22, 24, 26, and 28 to section 34. If one attempts to fold the apparatus 1 from the first assembled state in FIGS. 6A-6B, along lines 8 and 12, one also cannot do so, at least not substantially, because of the manner of attachment of sections 22, 24, 26, and 28 to section 34.

In contrast, in at least one embodiment of U.S. Pat. No. 9,351,415 (hereinafter "Zaccaria '415) issued on May 24, 2016, to inventor Nathan J. Zaccaria, the assembled apparatus 1 shown in FIG. 4 of Zaccaria '415 may have a tendency to collapse along fold lines 2a and 10a shown in FIG. 1A of Zaccaria '415, as shown in FIG. 9 of Zaccaria '415, when there is no support or external pressure on sections 2, 24, 12, and 10 of Zaccaria '415.

However, in some embodiments of the present application, further fold lines may be included in sections 6 and 14, for example, similar to fold lines 2a and 10a shown in Zaccaria '415, which is incorporated by reference herein. Although not preferred, such further fold lines, may allow the apparatus 1 of the present application to collapse into a different closed state.

Figure 13A:
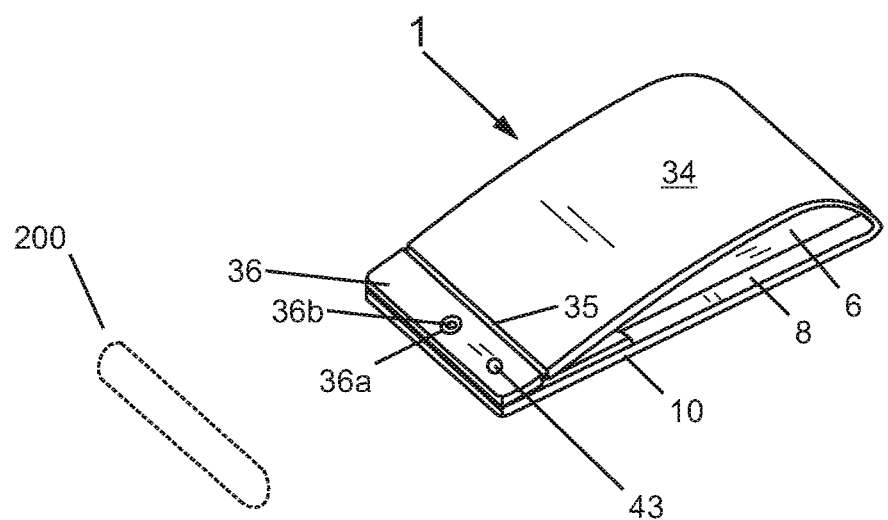
FIG. 13A shows a front, top, and right side perspective view of the apparatus of FIG. 1 in the tenth or closed state, and with a band next to the apparatus of FIG. 1.
Figure 13B:
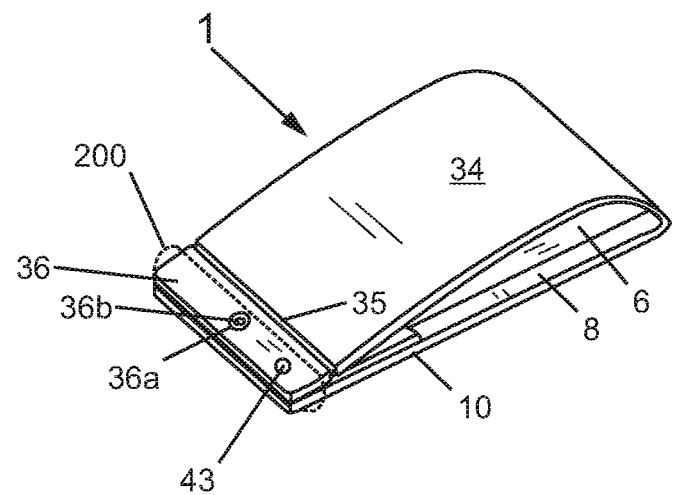
FIG. 13B shows a front, top, and right side perspective view of the apparatus of FIG. 1 in the tenth or closed state, and with the band of FIG. 13A, placed around a portion of the apparatus of FIG. 1.

In at least one embodiment of the present application, sections 8, 12, 32, and 36 may be widened to allow formation of a sufficient cavity when the apparatus 1 is in the closed state of FIGS. 13A-B, so that the apparatus 1 can hold the combination of folded sections 6, 4, 2, 30, 26, 28,14, 16, 18, 22, 24, and 20 and allow a device 100 that has a cover or no cover, to remain in the same position and orientation with respect to section 10. For example, device 100 can be located on and aligned with section 10, in the area shown by dashed lines in FIG. 8. At this point, the device 100 can be thought of as being a part of section 10, and the sections 14, 16, 18, 20, 22, and 24 can be folded onto the combination of sections 10 and device 100, as previously described with reference to section 10, and then the sections 2, 4, 6, 26, 28, and 30 can be folded onto the combination of sections 10, device 100, and sections 14, 16, 18, 20, 22, and 24, as previously described with reference to FIGS. 8-11. In FIGS. 8-9, an entire surface such as a top surface of the device or smartphone 100 (having the screen 102) can be seen, as shown by dashed lines. In FIG. 10, the top surface of the device 100 is now partially, and substantially covered and protected by the sections 14, 16, 18, 20, 22, and 24, which are folded on top of the device 100, and on top of the screen 102. In FIG. 11, the top surface of the device 100 is more fully covered then in FIG. 10. In FIG. 12, the top surface of the device 100 is now fully covered by section 34. The device 10, in FIG. 12, is now protected and secured within a pocket of the apparatus 1.

When widening sections 8, 12, and 36 to form a cavity or pocket for device 100 section 36 may or may not need to be widened. Generally it is preferred that section 36 be widened to form a cavity, but in at least one embodiment it may not need to be and the apparatus 1 can still be placed into a "closed" state.

Although the attachment device 28a is shown attached at a location in section 28 FIG. 1A, the attachment device 28a can be attached to anywhere at a location in either or both of section 28 or 26, depending on the location of attachment device 34a. Similarly, although the attachment device 22a is shown attached at a location in section 22, the attachment device 22a can be attached to anywhere at a location in either or both of section 24 or 22, depending on the location of attachment device 34a.

In at least one embodiment sections 8, 12, 32, and 36 may have an opening or openings, such as openings 40, 41, 42 and 43, respectively, shown in FIG. 1A. Such openings can be located anywhere within these sections to allow for access to the device 100 being accommodated, for reasons such as, but not limited to charging, earbud/earphone jack, speaker, power control, volume control and microphone.

In at least one embodiment, section 10 may have a retainer section 50 which may be a substantially rectangular portion of section 10 located across the width of section 10, from line 10c to edge 10d in FIG. 1A at or near the outer edge to keep the device 100 from slipping out when on section 10. The section 50 may be somewhat thicker than the rest of section 10, so that the device 100 sits on section 10, but not on section 50, and is prevented by section 50 from sliding off of the rest of section 10. The retainer 50 may have an opening 51 or further openings in FIG. 1A to allow for access to the device 100 being accommodated, for reasons such as, but not limited to charging, earbud/earphone jack, speaker, power control, volume control and microphone.

The retainer 50 may be of different shapes, for example, the retainer 50 may be comprised of two separate corner portions, approximately at the junction of line 10d, and section 8 and approximately at the junction of line 10d and section 12 to keep device 100 from sliding off of section 10. In such an embodiment, the section 50 may not need to go continuously all the way across the width of section 10 from the border with section 8 to the border of section 12.

In at least one embodiment sections 2, 6, 14, 18, 10, 34 may have optional pockets 60, 61, 62, 63, 64, and 65, respectively, shown by dashed lines in FIG. 1A, but not shown in other drawings. Alternatively, one or more of sections 2, 6, 14, 18, 10, 34 may have a pocket. The pockets 60, 61, 62, 63, 64, and 65 may be attached to, integrated with, and or protrude from the top surface or the bottom surface of the respective sections. Each of the pockets 60, 61, 62, 63, 64, and 65 may be used to hold or store things such, but not limited to a driver's license, credit card, and keys etc.

In at least one embodiment section 10 may have mark, marks, crease or creases such as 10c. The line 10c may also mark the border of the retainer or section 50. The line 10c may be located closer to section 32 than shown in FIG. 1, and may not be the border of section 50. The line 10c may be used to indicate where different size devices 100 will be placed on section 10. For example, to help someone know where to place the device 100 so the camera lens of the device 100 will align with the opening 38 in apparatus 1. An individual may align the edge of the device 100 with the line or crease 10c.

The device 100 can be a mobile electronic device such as, but not limited to, a smartphone, e-reader, ipad (trademarked) or tablet.

The apparatus 1 can be of different sizes and dimensions depending on the mobile electronic device which is being accommodated.

In at least one embodiment section 10 is longer than section 34, where the length of each of sections 10, and 34 is greater than the width of sections 10 and 34.

Figure 14:
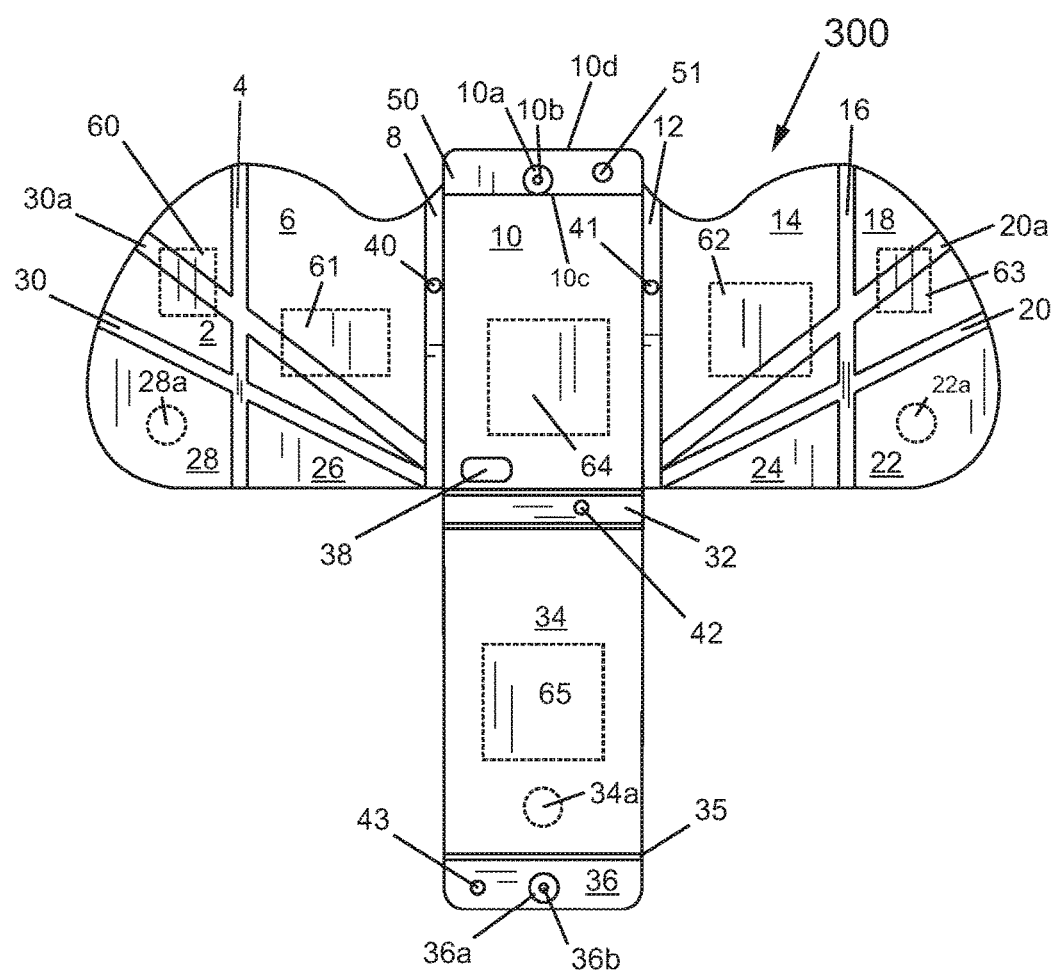
FIG. 14 shows a top view of another apparatus in accordance with another embodiment of the present invention which may be identical to the apparatus of FIG. 1A, except for providing multiple sections on each side to help orient the apparatus at different angles when assembled in a closed state similar or identical to FIGS. 13A-13B.

FIG. 14 shows a top view of another apparatus 300 in accordance with another embodiment of the present invention which may be identical to the apparatus 1 of FIG. 1A, except for providing multiple sections 20 and 20a on the left side, and multiple sections 30 and 30a on the right side of central section 10, to help orient the apparatus 300 at different angles when in an assembled state similar or identical to FIGS. 6A-6B and 7A-7B. The apparatus 300 may be put in an assembled state by orienting sections 20 and 30 parallel to section 34 as in FIGS. 4A-4B, and folding along sections 20 and 30 as previously explained with reference to FIGS. 3A-B, 4A-4B, 5A-5B, and 6A-6B.

Alternatively, to put the section 10 at a different, and reduced angle with respect to section 34, the apparatus 300 may be put in an assembled state by orienting sections 20a and 30a parallel to section 34 (similar to what is done from FIGS. 3A-B to FIGS. 4A-4B, but now orienting sections 20a and 30a parallel to section 34, instead of sections 20 and 30) and folding along sections 20a and 30a (similar to what is done from FIGS. 4A-4B to FIGS. 5A-5B, but now folding along sections 20a and 30a). Using sections 20a and 30a, instead of sections 20 and 30, puts the section 10 at a different and lesser angle with respect to section 34, than with sections 20 and 30, and this may be desired by a user attempting to provide the correct sun or light shading.

The apparatus 1, as shown in FIG. 1A, is typically symmetrical about a center line along a length of sections 10 and 34, which cuts the apparatus 1 in half. The apparatus 1 in its first assembled state of FIG. 6A is substantially symmetrical in the sense that a mobile electronics device 100 can be placed on either section 10 or section 34, and the apparatus 1 would function largely the same, although there may be some significant differences.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section;
wherein the apparatus is configured so that the apparatus can alternately be placed in a flat state, in which the first central section, the second central section, the left side wall, and the right side wall are located in one plane or placed in the first assembled state;
wherein the left side wall is attached along a first linear section to a first folding section, wherein the first linear section is at an angle of less than ninety with respect to the first central section, in the flat state;
the right side wall is attached along a second linear section to a second folding section, wherein the second linear section is at an angle of less than ninety degrees with respect to the first central section, in the flat state;
wherein the first folding section attaches to the second central section, and the left side wall is at approximately a ninety degree angle with respect to the first folding section, when the apparatus is in the first assembled state;
wherein the second folding section attaches to the second central section, and the right side wall is at approximately a ninety degree angle with respect to the second folding section, when the apparatus is in the first assembled state; and
wherein the first linear section is made of a thinner material than a majority of the left side wall, and the second linear section is made of a thinner material than a majority of the right side wall.

2. The apparatus of claim 1 wherein
the first central section is at an angle of about seventy degrees with respect to the second central section in the first assembled state.

3. The apparatus of claim 1 wherein
at least part of the left side wall is attached along a third linear section to a third folding section, wherein the third linear section is at an angle of less than ninety degrees with respect to the first central section, in the flat state, which is different from the angle of the first linear section with respect to the first central section in the flat state;
wherein at least part of the right side wall is attached along a fourth linear section to a fourth folding section, wherein the fourth linear section is at an angle of less than ninety degrees with respect to the first central section, in the flat state, which is different from the angle of the second linear section with respect to the central section in the flat state;
wherein the third linear section attaches to the second central section, and the at least part of the left side wall is at approximately a ninety degree angle with respect to the third linear section, when the apparatus is in a second assembled state which is different from the first assembled state; and
wherein the fourth linear section attaches to the second central section, and at least part of the right side wall is at approximately a ninety degree angle with respect to the fourth folding section, when the apparatus is in the second assembled state.

4. The apparatus of claim 1 wherein
the first central section includes a first attachment device;
wherein the second central section includes a second attachment device;
and wherein the first and second attachment devices are configured to temporarily attach to each other to thereby temporarily attach the first central section and the second central section together in a closed state in which the first central section is substantially aligned and substantially parallel with the second central section, and the left side wall and the right side wall are located in between the first central section and the second central section.

5. The apparatus of claim 4 wherein
the first central section is comprised of an attachment device which is configured to attach to the mobile electronics device or to a cover of the mobile electronics device for temporarily holding the mobile electronics device to the first central section when the apparatus is in the first assembled state; and
which is configured to attach to the mobile electronic device for temporarily holding the mobile electronics device to the first central section when the apparatus is in the closed state.

6. The apparatus of claim 4 wherein
the apparatus is configured so that the mobile electronics device can remain on the first central section, substantially aligned and substantially parallel to the first central section, covered by the left side wall, and the right side wall, and the second central section, when the apparatus is in the closed state.

7. The apparatus of claim 1 wherein
the left side wall is divided by a first linear section which is parallel to the first central section, and the first linear section allows the left side wall to be easily folded along the first linear section; and
the right side wall is divided by a second linear section, which is parallel to the first central section, and the second linear section allows the right side wall to be easily folded along the second linear section.

8. The apparatus of claim 1 wherein
wherein the first folding section encompasses a first area;
wherein the first folding section includes a first magnetic attraction device, wherein the first magnetic attraction device encompasses a first region which is less than half the first area;

wherein the second folding section encompasses a second area;

wherein the second folding section includes a second magnetic attraction device, wherein the second magnetic attraction device encompasses a second region which is less than half the second area;

wherein the second central section encompasses a third area;

wherein the second central section includes a third magnetic attraction device, wherein the third magnetic attraction device encompasses a third region which is less than half the third area;

and wherein the apparatus is configured so that in the first assembled state, the first magnetic attraction device, the second magnetic attraction device, and the third magnetic attraction device substantially align with each other and are attracted to each other magnetically, and attach to each other magnetically, to attach the first folding section, the second folding section, and the second central section to each other, to keep the apparatus in the first assembled state.

9. The apparatus of claim 1 wherein the first central section is comprised of an attachment device which is configured to attach to the mobile electronics device or to a cover of the mobile electronics device for temporarily holding the mobile electronics device to the first central section when the apparatus is in the first assembled state.

10. The apparatus of claim 1 wherein the apparatus can be placed in a flat state in which the first central section, the second central section, the left side wall, and the right side wall are all in the same plane, and none of the first central section, the second central section, the left side wall, and the right side wall lies on top of any other of the first central section, the second central section, the left side wall, and the right side wall;

wherein in the flat state, the second central section is attached along a first line to the first central section, and is not attached at any other location to any of the first central location, the left side wall, and the right side wall; and and wherein in the flat state, not including the first central section, and the second central section, no part of the apparatus overlaps the second central section.

11. The apparatus of claim 1 wherein the left side wall has a curve;

the right side wall has a curve;

the curve of the left side wall allows an individual to at least partially enter a first thumb of the individual into an inner chamber bound by the first central section, the second central section, the left side wall, and the right side wall, and the curve of the right side wall allows the individual to simultaneously at least partially enter a second thumb of the individual into the inner chamber bound by the first central section, the second central section, the left side wall, and the right side wall so that the individual can touch the screen of the mobile electronics device with the first and the second thumb to thereby enter a text into the mobile electronics device.

12. The apparatus of claim 1 wherein an opening is provided in the first central section, wherein the opening is configured to be aligned with a camera lens of the mobile electronics device, when the mobile electronics device is located on and substantially overlaps the first central section, and the apparatus is in the first assembled state.

13. The apparatus of claim 12 further comprising the mobile electronics device.

14. An apparatus comprising:

a first central section;

a second central section;

a left side wall; and a right side wall; and wherein the first central section, the second central section, the left side wall, and the right side wall are attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section;

wherein the left side wall is attached along a first linear section to the first central section;

wherein the first linear section has a length, a width, and a depth, wherein the length of the first linear section is substantially greater than the width of the first linear section, and the width of the first linear section is greater than the depth of the first linear section;

wherein the first linear section is parallel to the first central section, and wherein the first linear section has a first opening having a diameter less than the width of the first linear section;

the right side wall is attached along a second linear section to the first central section;

wherein the second linear section has a length, a width, and a depth, wherein the length of the second linear section is substantially greater than the width of the second linear section, and the width of the second linear section is greater than the depth of the second linear section;

wherein the second linear section is parallel to the first central section, and wherein the second linear section has a second opening having a diameter less than the width of the second linear section.

15. The apparatus of claim 14 wherein the first linear section is made of a thinner material than the majority of the left side wall, and the second linear section is made of a thinner material than the majority of the right side wall.

16. An apparatus comprising:

a first central section;

a second central section;

a left side wall; and a right side wall; and wherein the first central section, the second central section, the left side wall, and the right side wall are attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section;

wherein
each of the left side wall, the right side wall, the first central section, and the second central section includes a pocket for holding an item, so that the apparatus includes at least four separate pockets, in addition to a combination pocket that is formed by a combination of the first central section, the second central section, the left side wall, and the right side wall when the apparatus is in the first assembled state.

17. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section;

wherein
the second central section is attached along a first linear section to the first central section;
wherein the first linear section has a length, a width, and a depth, wherein the length of the first linear section is substantially greater than the width of the first linear section, and the width of the first linear section is greater than the depth of the first linear section; and
wherein the first linear section is parallel to the first central section, and wherein the first linear section has a first opening having a diameter less than the width of the first linear section.

18. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle of substantially less than ninety degrees and substantially more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section;

wherein
the first central section includes a retainer section which takes up less than a majority of the first central section, and which is thicker in depth than a remainder of the first central section, and is configured to inhibit the mobile electronics device from sliding off of the first central section.

19. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section;
and wherein the left side wall is attached along a first linear section to the first central section;
wherein the first linear section has a length, a width, and a depth, wherein the length of the first linear section is substantially greater than the width of the first linear section, and the width of the first linear section is greater than the depth of the first linear section;
wherein the first linear section is parallel to the first central section, and wherein the first linear section has a first opening having a diameter less than the width of the first linear section;
the right side wall is attached along a second linear section to the first central section;
wherein the second linear section has a length, a width, and a depth, wherein the length of the second linear section is substantially greater than the width of the second linear section, and the width of the second linear section is greater than the depth of the second linear section;
wherein the second linear section is parallel to the first central section, and wherein the second linear section has a second opening having a diameter less than the width of the second linear section.

20. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle of more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section; and
wherein at least one of the left side wall, the right side wall, the first central section, and the second central section includes a separate pocket for holding an item, so that the apparatus includes at least one separate pocket, in addition to a combination pocket that is formed by a combination of the first central section, the second central section, the left side wall, and the right side wall when the apparatus is in the first assembled state.

21. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle of more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section; and
wherein the second central section is attached along a first linear section to the first central section;
wherein the first linear section has a length, a width, and a depth, wherein the length of the first linear section is substantially greater than the width of the first linear section, and the width of the first linear section is greater than the depth of the first linear section; and
wherein the first linear section is parallel to the first central section, and wherein the first linear section has a first opening having a diameter less than the width of the first linear section.

22. An apparatus comprising:
a first central section;
a second central section;
a left side wall; and
a right side wall; and
wherein the first central section, the second central section, the left side wall, and the right side wall are attached together in a first assembled state so that the first central section is adjacent to and at a first angle of more than zero degrees with respect to the second central section, and the left side wall and the right side wall are adjacent to and approximately perpendicular to the second central section, and so that a mobile electronics device having a screen, can be placed on the first central section, and the screen viewed, with the left side wall, the right side wall, and the second central section providing shading to the mobile electronics device when it is on the first central section; and
wherein the first central section includes a retainer section which takes up less than a majority of the first central section, and which is thicker in depth than a remainder of the first central section, and is configured to inhibit the mobile electronics device from sliding off of the first central section.

* * * * *